United States Patent [19]
Dörr et al.

[11] 3,944,401
[45] Mar. 16, 1976

[54] PROCESS FOR THE REMOVAL OF GASEOUS IMPURITIES FROM THE EXHAUST GASES OF A CONTACT-PROCESS PLANT FOR THE PRODUCTION OF SULFURIC ACID

[75] Inventors: Karl-Heinz Dörr, Mainz; Hugo Grimm, Frankfurt am Main; Ulrich Sander, Friedrichsdorf; Robert Peichl, Kelheim; Michael Tacke, Offenbach, all of Germany

[73] Assignees: Metallgesellschaft Aktiengesellschaft, Frankfurt am Main; Sud-Chemie AG, Munich, both of Germany

[22] Filed: May 6, 1974

[21] Appl. No.: 467,387

[30] Foreign Application Priority Data
May 8, 1973 Germany............................ 2322982

[52] U.S. Cl. ........................ 55/73; 55/94; 423/522
[51] Int. Cl.² ......................................... B01D 47/14
[58] Field of Search ......... 204/103, 104; 55/73, 94; 261/117, 116; 423/242, 533, 522

[56] References Cited
UNITED STATES PATENTS

| | | | |
|---|---|---|---|
| 3,523,880 | 8/1970 | Parsi .................................. | 204/104 |
| 3,524,801 | 8/1970 | Parsi .................................. | 204/104 |
| 3,760,061 | 9/1973 | Hammond ......................... | 423/242 |
| 3,780,499 | 12/1973 | Dörr et al. .............................. | 55/73 |
| 3,788,043 | 1/1974 | Dörr et al. ............................. | 55/237 |

FOREIGN PATENTS OR APPLICATIONS

| | | | |
|---|---|---|---|
| 670,966 | 1939 | Germany ............................ | 423/242 |
| 1,234,912 | 1967 | Germany ............................ | 423/242 |

*Primary Examiner*—John Adee
*Attorney, Agent, or Firm*—Karl F. Ross; Herbert Dubno

[57] ABSTRACT

Sulfur compounds oxidizable to form sulfuric acid and organic compounds oxidizable to $CO_2$ and $H_2O$ are removed from an exhaust gas of a contact-process plant for producing sulfuric acid by treating the exhaust gas with a scrubbing solution consisting of dilute sulfuric acid and peroxydisulfuric acid. The peroxydisulfuric acid is produced electrolytically from fresh dilute sulfuric acid and the resulting electrolyte is continuously introduced into the scrubbing acid cycle. The exhaust gas is treated in a vertical venturi with uniflow, i.e. co-directional flow of the gas and the scrubbing solution, and the gas is then passed through a horizontal venturi and subsequently upwardly through a packing layer.

21 Claims, 1 Drawing Figure

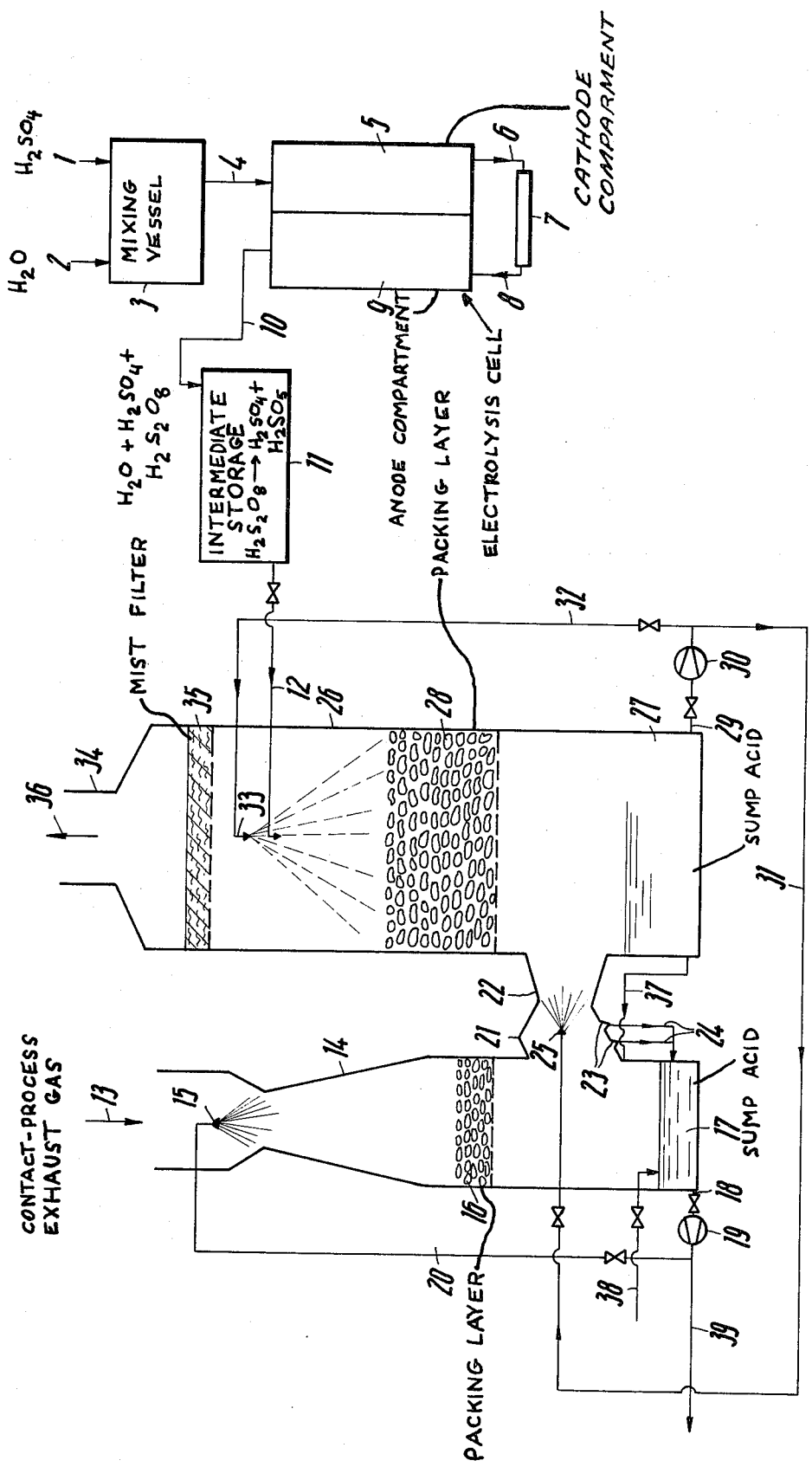

PROCESS FOR THE REMOVAL OF GASEOUS IMPURITIES FROM THE EXHAUST GASES OF A CONTACT-PROCESS PLANT FOR THE PRODUCTION OF SULFURIC ACID

CROSS-REFERENCE TO RELATED APPLICATION

The present Application is related to the commonly assigned copending application Ser. No. 308,849 filed Nov. 22, 1972 and entitled METHOD OF REMOVING GASEOUS IMPURITIES FROM WASTE GASES now abandoned. The latter application relates to subject matter disclosed and claimed in copending application Ser. No. 74,629 filed Sept. 23, 1970 now abandoned, commonly assigned copending application Ser. No. 188,127 filed Oct. 12, 1971, and commonly assigned copending application Ser. No. 188,128 filed Oct. 12, 1971, now U.S. Pat. Nos. 3,780,499 and 3,788,043 respectively, all dealing with absorption systems and gases containing sulfur oxides and naming one or more of the present joint inventors.

FIELD OF THE INVENTION

The present invention relates to a process for the removal of sulfur compounds oxidizable to form sulfuric acid and organic compounds oxidizable to form $CO_2$ and $H_2O$ from the exhaust gases produced by contact-process plants for making sulfuric acid.

BACKGROUND OF THE INVENTION

As pointed out in application Ser. No. 308,849, sulfur-containing gases and particulates are a major problem in modern societies because they are released into the atmosphere from many sources and are highly toxic to the population, to vegetation and to metal, stone and other structures.

In the combustion of fuel oil and coal, for example, elemental sulfur and sulfur oxides may be released into the atmosphere.

From chemical plants, organic sulfur compounds, hydrogen sulfide and sulfur oxides may be released into the atmosphere.

In sulfuric acid plants, the waste gases following the final absorption may contain toxic or dangerous quantities of residual sulfur dioxide and sulfur trioxide.

In the roasting of metal and other metallurgical processes, the release of elemental sulfur, and sulfur compounds, especially sulfur oxides, has long been a problem.

Consequently, considerable effort has been made to obtain an efficient, low-cost system for removing sulfur compounds from waste gases and capable of minimizing the release of such gases into the atmosphere.

A large number of processes have been suggested for this purpose as described, for example, in the literature references cited in application Ser. No. 308,849. These processes include washing the gas with sodium carbonate solution followed by crystallization of sodium sulfite, washing the gas with a magnesia slurry followed by crystallization and recovery of the magnesia as well as concentrated sulfur dioxide, washing the gas with gaseous potassium sulfite which is then recovered by stripping from the precipitated pyrosulfite. More complex and extensive systems may also be mentioned here, although they have been more or less fully described in the aforementioned copending applications as representing the state of the art. Suffice it to say that it has been discovered by some of the present applicants jointly with another, as decribed in application Ser. No. 308,849, that waste gases can be economically treated with a dilute sulfuric acid containing peroxydisulfuric acid in such manner that sulfur trioxide results. A critical feature of the system described in the last-mentioned application is that the peroxydisulfuric acid level in the treating solution is replenished by the electrolysis of fresh dilute sulfuric acid (electrolysis-cell acid) with the peroxydisulfuric acid solution thus produced being mixed with dilute sulfuric acid to form the gas-treating liquor. The peroxydisulfuric acid which decomposes upon treatment of the gas, the sulfuric acid formed by absorption of the sulfur trioxide in the dilute sulfur acid and the dilute sulfuric acid serving as the treatment vehicle and absorber can thus be drawn off without recycling to the electrolysis cell.

Best results were obtained using this system with gas streams containing sulfur dioxide and those with the exhaust gases of combustion installations such as furnaces, metal or roasting plants and sulfuric acid plants.

The system of application Ser. No. 308,849 may be used, in addition, to remove sulfur-containing impurities other than sulfur dioxide from an exhaust gas. It has been found that inorganic sulfur compounds containing sulfur in an oxidation state in which it can be oxidized to elemental sulfur and/or to sulfur dioxide can be removed with that system. For example, inorganic sulfides and hydrogen sulfide can be treated with the peroxydisulfuric acid solution and oxidized to elemental sulfur and eventually sulfur trioxide.

The peroxydisulfuric acid concentration was preferably between 200 and 300 grams of peroxydisulfuric acid per liter in the cell acid, most advantageously between 240 and 260 grams per liter. At these concentrations a high yield or efficiency was obtained and practically no water was introduced into the system so that local overheating and thermal degradation of the peroxydisulfuric acid was avoided.

The dilute sulfuric acid had a concentration of 25 to 60% by weight, this concentration giving the efficient washing and absorption characteristics. Sulfur trioxide, present in the exhaust gas, and/or sulfuric acid mist (which is generally present when the exhaust gas is derived from a sulfuric acid plant) can be removed simultaneously in spite of the fact that these components are not oxidized. The exhaust gas may contain organic compounds which are oxidized by the peroxydisulfuric acid system to carbon dioxide and water vapor.

The gas was treated with the liquid phase in uniflow by passing the gas phase and the liquid phase jointly through the constriction of a venturi absorber. As described in applications Ser. Nos. 74,629, 188,127 and 188,128 and in our earlier individual and joint efforts, for reasons which are not fully understood the intimate contact produced by forcing the liquid phase jointly through a construction and thereafter permitting the mixture of the two phases to expand past the constriction yields a far more effective interaction of the two phases than can be obtained with theoretically equivalent washing towers in which the gas and liquid have similar contact times and interflow velocity. The gas, after the treatment with and separation from dilute sulfuric acid, was conducted through a droplet separator designed to avoid entraining of acid droplets along with the gas. The droplet separator was a packed bed traversed by the gas and from an impingement, collector and interaction surfaces which not only prevent passage of the acid droplets through the layer but also bring about an intimate contact of the gas phase with the acid in the form of a liquid film of the latter or so-called after-absorption and after-reaction.

Where the gas is passed upwardly through a filter bed of this type, the lowermost layer consisted of a porous packing bed with particles of a particle size of 5 to 20 millimeters, preferably 9 to 15 millimeters. In this layer precipitation and removal of entrained acid droplets occurs. The packing bodies are coated with a liquid film in which the aforementioned after-absorption takes place. When this liquid film tends to become thicker, the sulfuric acid droplets fall from the layer. The rising gas stream and the pore size maintain a thin liquid layer above the packing mass.

The after-absorption is preferably effected in a layer having a height of 50 to 200 millimeters, preferably 80 to 120 millimeters, this bed height having been found to provide after-absorption with a minimum of increased flow resistance. The gas velocity furing after-absorption was 1 to 2.5 meters per second, preferably 1.3 to 1.7 meters per second.

After traversing the after-absorption layer of a thickness of 50 to 200 millimeters and composed of porous packing bodies with a particle size of 5 to 20 millimeters at a gas velocity of 1 to 2.5 meters per second, the gas passed through a layer of acid-resistance nonporous packing bodies with a particle size of 20 to 50 millimeters in an after-absorption stage, the latter overlying the after-absorption bed.

The after-separation bed not only loads the after-absorption bed to prevent migration of the packing bodies but also provides impingement-type liquid-separation surfaces together with narrower and random channels in which residual droplets of acid may be separated from the gas phase. The after-separation bed has a thickness of 50 to 150 millimeters, preferably 80 to 120 millimeters, a range which has been found to be effective for efficient separation of the residual liquid from the gas phase without materially increasing the flow resistance.

It was found to be desirable to treat the gas (containing sulfur compounds and other compounds oxidizable by peroxydisulfuric acid to sulfur dioxide, carbon dioxide and water vapor) with a dilute sulfuric acid containing the peroxydisulfuric acid in a venturi-type apparatus in uniflow, i.e. a system in which the gas and liquid phases flow in the same direction. The venturi absorber was provided ahead of the venturi constriction and expansion chamber with a liquid-collecting chamber and means for diverting the gas stream from its axial flow direction as it emerges from the venturi chamber. The gas stream was diverted by an angle of 90° or more, thereby causing droplets of high kinetic energy to pass through the bodies of liquid in the bath disposed ahead of the venturi outlet. The venturi absorber was preferably oriented vertically so that its outlet was directed downwardly into this bath and the expansion chamber was provided with lateral outlets above the bath so that the main body of gas is first directed downward toward the bath and is then diverted upwardly and laterally to shed larger droplets and high-energy particles.

The acid collected in the sump was in part recirculated to the venturi. It was also advantageous to pass the gas phase into contact with the peroxydisulfuric acid/dilute sulfuric acid liquid phase by forcing the gas upwardly through a gas-permeable plate upon which the acid layer was provided. The gas-permeable plate was composed of a porous material such as sintered glass or porcelain. The gas permeability, gas-flow velocity and volume were so dimensioned that little or no sulfuric acid solution passed through the plate. Best results were obtained when the after-absorber and after-separator beds of packing were provided upon the perfoated plate or upon respective prerforated plates in cascade.

The parts of the apparatus which came into contact with the acid solution were constituted from or were coated with acid resistance, preferably polyvinil chloride.

OBJECTS OF THE INVENTION

It is the principal object of the present invention to provide an improved method of removing gaseous impurities from the waste gases of a contact-process plate for producing sulfuric acid.

Another object of the invention is to extend the principles originally set forth in application Ser. No. 308,849.

SUMMARY OF THE INVENTION

According to the invention, this object is accomplished in that the exhaust gas is treated in a vertical venturi tube with cocurrent injected circulating scrubbing acid from the sump of the venturi tube, at least part of the injected scrubbing acid being separated and collected in the sump of the venturi tube.

The gas is conducted into a substantially horizontal venturi tube disposed between the sump and the outlet opening of the vertical venturi tube and opening into a tower, the gas being treated in the horizontal venturi tube with cocurrent injected circulating scrubbing acid from the sump of the tower.

The injected scrubbing acid is separated and is collected in the sump of the tower; the gas rising in the tower, which contains a packing layer, is treated with countercurrent circulating scrubbing acid coming from the sump of the tower and injected above the packing layer, and with the added acid electrolyte which contains peroxydisulfuric acid, and the acids fed into the tower are separated and are collected to the sump of the tower.

Preferably a large part of the circulating scrubbing acid injected into the vertical venturi tube is separated and is collected in the sump of this venturi tube since even the scrubbing acid which has been entrained into the inlet of the substantially horizontal venturi tube as far as the throat thereof is recycled.

The separation and recycling of the scrubbing acid which has been entrained to the narrowest part or throat of the substantially horizontal venturi tube from the vertical venturi tube may be accomplished by downwardly inclining the gas outlet conduit from the vertical venturi tube, or by the provision of baffles in the gas outlet conduit and by the provision of drain openings in the lower portion of the gas outlet conduit or in the inlet portion of the substantially horizontal venturi tube. These drain openings are connected by conduits to the sump of the vertical venturi tube.

As a result of these measures, which may be used individually or in combination, a major portion of the scrubbing acid entrained from the vertical venturi tube is separated and conducted into the sump of that venturi tube so that the scrubbing acid cycles can be separated to a high degree.

Advantageously, a large part of the circulating scrubbing acid injected into the vertical venturi tube is separated and is collected in the sump of the venturi tube because a packing layer is provided below the outlet opening of the venturi tube and above the inlet opening of the substantially horizontal venturi tube. This packing layer has a thickness of about 10–20 centimeter. The high turbulence produced in that layer also promotes the separation of the scrubbing acid, which is then collected in the sump of the vertical venturi tube.

Scrubbing acid can be transferred from the sump of the tower via an overflow into the sump of the vertical venturi tube in a quantity which corresponds to the added electrolyte acid containing peroxydisulfuric acid and to the sulfuric acid formed as an oxidation product in the substantially horizontal venturi tube. In this simple way, a constant level is maintained in the tower sump and the entire system is operated in countercurrent of liquid and gas flow so that the active oxygen is optimally utilized. Besides, a steady-state concentration of active oxygen in the sump of the vertical venturi tube is maintained constant.

The steady-state sulfuric acid concentration of the scrubbing acid in the sump of the vertical venturi tube is held constant by an addition of water. As a result, the evaporative loss of water is compensated and the heat of the resulting mixture is utilized for a hydrolysis of the residual peroxydisulfuric acid in the sump of the vertical venturi tube.

The level of the sump in the vertical venturi tube is held constant by a withdrawal of scrubbing acid, which contains the oxidation product, from the sump. In that case, the product is withdrawn from the system at a point where the content of residual active oxygen is lowest.

Different concentrations of sulfuric acid are maintained in the cycles of the circulating scrubbing acid, the highest concentrations of sulfuric acid and active oxygen being provided in the acid which is sprayed into the tower, a lower concentration being provided in the acid which is injected into the substantially horizontal venturi tube, and the lowest concentration being provided in the acid which is injected into the vertical venturi tube. This results in an optimum oxidation of $SO_2$ and/or of other oxidizable gas components and an optimum utilization of the active oxygen supplied to the system.

The electrolyte acid which emerges from the electrolytic unit and contains peroxydisulfuric acid consists of sulfuric acid which has a concentration of 30 – 50% by weight $H_2SO_4$, preferably 35 – 40% by weight $H_2SO_4$, and contains 180 – 350 grams, preferably 200 – 300 grams, peroxydisulfuric acid per liter. These concentrations give very good results in operation.

Advantageously, the acid electrolyte which contains peroxydisulfuric acid is held in intermediate storage to increase the hydrolysis of the peroxydisulfuric acid. The increased hydrolysis of $H_2S_2O_8$ to $H_2SO_5$ and $H_2SO_4$ results in a higher rate of oxidation of the gas components in the succeeding scrubber. Besides, the intermediate storage provides for a supply from which acid electrolyte which contains active oxygen can be withdrawn immediately at a suitable rate in case of fluctuations of the gas rate. Besides, the high $SO_2$ content of the exhaust gas from a sulfuric acid contact process plant when being started up, may be absorbed in that the entire system is filled from the supply tank with electrolyte acid containing a high concentration of active oxygen so that there is initially a high content of active oxygen in all absorption stages.

The intermediate storage is continued until a hydrolysis of 30 – 90% has been effected. That degree of hydrolysis gives good results in operation.

The stationary steady-state concentration of the scrubbing acid in the sump of the tower most desirably amounts to 30 – 50% by weight, preferably 38 – 45% by weight, sulfuric and a molar concentration of active oxygen 0.4–1.26 moles, preferably 0.6–1.0 moles per liter. High degrees of oxidation are obtained with these concentrations.

The stationary steady-state concentration of the scrubbing acid in the sump of the vertical venturi tube is advantageously 25 – 40% by weight sulfuric acid, preferably 28 – 32% by weight, and the active oxygen has a concentration of 0.06–0.3 moles per liter, preferably 0.1 – 0.15 moles per liter. A relatively high water vapor partial pressure in the gas phase and high degrees of oxidation are obtained with these concentrations.

The residence time of the scrubbing acid which contains the residual peroxydisulfuric acid in the sump of the tower and in the sump of the vertical venturi tube is adjusted so that 20 – 90% of the residual peroxydisulfuric acid are hydrolyzed in each sump. The further hydrolysis of $H_2S_2O_8$ to $H_2SO_5$ and $H_2SO_4$ improves the degree of oxidation. Besides, the volumes of the sumps can be dimensioned such that the higher $SO_2$ content of the exhaust gases produced during the starting period of the contact process plant can be absorbed because an adequate supply of active oxygen is available.

The included angle at the outlet of the vertical venturi tube and of the substantially horizontal venturi tube is 10° – 20°, preferably 14° – 17°. As a result, the total gas pressure loss in the venturi tube is minimized and, in addition to the venturi effect proper, a turbulence is created to provide for an optimum gas-liquid interface allowing an optimum degree of oxidation.

The gas is passed through the entire system with an average retention time of 2 – 4 seconds. This retention time allows a high degree of oxidation while keeping the dimensions of the equipment at a minimum.

The withdrawn scrubbing acid which contains the oxidation product is supplied to the final absorber of the contact process plant. In this way, the residual active oxygen withdrawn from the system is utilized for an oxidation in the final absorber of the contact process plant and the content of oxidizable compounds in the exhaust gases is reduced before they enter the system.

The quantity of peracids depends on the oxidation equivalent of the exhaust gas components to be oxidized and on the desired degree of oxidation and the desired purity of the exhaust gases.

The packing layer in the tower has suitably a thickness of 40–80 centimeters. This results in a high degree of oxidation and in a relatively low gas pressure loss.

The outlet opening of the tower is preceded by a wire mesh filter which provides for a good separation of entrained liquid in conjunction with a low pressure loss.

The entire system can be made to a large extent from plastic or synthetic-resin material.

BRIEF DESCRIPTION OF THE DRAWING

The above and other objects, features and advantages of the present invention will become more readily apparent from the following description, reference being made to the accompanying drawing in which the sole FIGURE is a flow diagram illustrating the inven-

SPECIFIC DESCRIPTION

A mixing vessel 3 is supplied with sulfuric acid through conduit 1 and with diluent water through conduit 2. The dilute sulfuric acid is used as electrolyte acid and is supplied through conduit 4 into the cathode space 5 of the electrolytic unit. The acid electrolyte flows through conduit 6 over filter 7 for an intermediate purification and through conduit 8 into the anode space 9 of the electrolytic unit. The electrolyte acid which contains peroxydisulfuric acid flows through conduit 10 into a supply container 11 for an intermediate storage to increase the degree of hydrolysis. Scrubbing acid which contains active oxygen is supplied through conduit 12 into the scrubbing acid cycle at the required rate.

The exhaust gas 13 from the final absorber of the contact process plant for producing sulfuric acid is fed into the head of the vertical venturi tube 14. Through the nozzle 15, circulating scrubbing acid is injected into the head of the venturi tube 14 and is mixed with the exhaust gas. A packing layer 16 is disposed below the outlet opening of the venturi tube 14. In this layer 16, the gas and scrubbing acid are further mixed and the injected scrubbing acid is separated.

A large part of the injected scrubbing acid is collected in the sump 17 of the venturi tube 14. The circulating scrubbing acid which contains active oxygen is pumped from the sump 17 through conduit 18, pump 19 and conduit 20 to the nozzle 15. The gas leaves the venturi tube 14 and enters the inlet pipe 21 of the substantially horizontal venturi tube 22.

The inlet pipe 21 is downwardly inclined, and drain openings 23 are installed in the lower part of the inlet pipe 21 and of the inlet portion of the venturi tube 22 and are connected to the sump 17 by return conduits 24. As a result, a large part of the scrubbing acid entrained from the venturi tube 14 into the venturi tube 22 is separated and flows into the sump 17. Through the nozzle 25, circulating scrubbing acid is injected into the venturi tube 22 and mixed with the gas. The mixture of gas and scrubbing acid enters the tower 26.

A large part of the scrubbing acid which has been injected into the venturi tube 22 is separated already in the lower part of the tower 26 and enters the sump 27. The gas rises through the packing layer 28.

Circulating scrubbing acid which contains active oxygen is pumped from the sump 27 through conduit 29, pump 30 and conduit 31 to the nozzle 25 and through conduit 32 to the nozzle 33 in the upper part of the tower 26. Electrolyte acid which contains active oxygen is also supplied from the container 11 through conduit 12 to the nozzle 33. The circulating scrubbing acid and acid electrolyte supplied into the tower trickle through the packing layer 28 into the sump 27.

The gas outlet 34 is preceded by a wire mesh filter 35, in which residual acid is separated from the gas and drips onto the packing layer 28. The purified gas 36 is discharged into the atmosphere. Scrubbing acid from the sump 27 is transferred over the overflow 37 into the sump 17. The scrubbing acid flows over at a rate which corresponds to the rate at which electrolyte acid containing active oxygen is supplied to the tower plus the rate at which sulfuric acid is produced by oxidation in the tower 26 and the venturi tube 22. Water is supplied through conduit 38 into the sump 17 of the venturi tube 14. The rate is controlled so that a steady-state concentration of sulfuric acid in the sump 17 remains constant. Scrubbing acid which contains the oxidation product is withdrawn through conduit 39. The rate is controlled so that the level in the sump 17 remains constant. The withdrawn acid is supplied to the final absorber of the contact process plant where the residual active oxygen is utilized for oxidation.

The advantages afforded by the invention reside mainly in that a conversion of 95% and more of $SO_2$, depending on the rate at which active oxygen is added, may be obtained so that the purified gas contains less than 50 ppm $SO_2$, and that the 70–90% of the sulfuric acid mist contained in the exhaust gas are absorbed. This extreme purification of the exhaust gas is accomplished with a small dimensioning of equipment and with a relatively high economy and results in a true increase of the total production of the sulfuric acid plant. Only electric energie is consumed as an operating supply; all other components are supplied from and returned to the cycle of the contact process plant for producing sulfuric acid. The water which is supplied is used to adjust the concentration in the acid cycles of the contact process plant. The residual active oxygen contained in the product which is withdrawn, is utilized in the final absorber so that virtually no active oxygen is lost. The pressure loss is low.

Because the cooling water for the electrolytic unit is only slightly heated, it may be used in the contact process plant, e.g. in the coolers for the acid cycles. In the purification of exhaust gases that have been used for reconcentration of acid, organic components and nitrous gases are oxidized in addition to the sulfur compounds.

The compact and simple installation requires only a small space and may be made to a large extent from plastic material. It may well be integrated in contact process plants.

| Examples: The Position Nos. correspond to the drawing | | | I | II | III | IV |
|---|---|---|---|---|---|---|
| Pos. 13 | gas volume | m³/h (STP) | 10 000 | 10 000 | 10 000 | 10 000 |
| | $SO_2$-content | ppm $SO_2$ | 550 | 600 | 850 | 1 050 |
| | gas temperature | °C | 76 | 75 | 76 | 76 |
| Pos. 36 | $SO_2$-content | ppm $SO_2$ | 51 | 47 | 98 | 105 |
| | gas temperature | °C | 32 | 34 | 35 | 35 |
| | gas retention time in system sec | | 3 | 3 | 3 | 3 |
| Pos. 12 | composition of the peroxidsulfuric acid a) active oxygen calculated as $H_2S_2O_2$ | g$H_2S_2O_x$/liter | 220 | 220 | 220 | 220 |

-continued

| Examples: The Position Nos. correspond to the drawing | | | I | II | III | IV |
|---|---|---|---|---|---|---|
| | b) $H_2SO_4$-content | % $H_2SO_4$ | 41 | 45 | 45 | 45 |
| | c) degree of hydrolysis $H_2SO_5/H_2S_2O_8$ | % | 10 | 70 | 70 | 70 |
| Pos. 27 | stationary stead-state composition of scrubbing acid | | | | | |
| | a) molar concentration of active oxygen | mol/liter | 0.62 | 0.50 | 0.40 | 0.40 |
| | b) $H_2SO_4$-concentration | %$H_2SO_4$ | 42 | 43 | 45 | 45 |
| | c) degree of hydrolysis $H_2SO_5/H_2S_2O_8$ | % | 40 | 40 | 40 | 40 |
| Pos. 17 | stationary steady-state composition of scrubbing acid | | | | | |
| | a) molar concentration of active oxygen | mol/liter | 0.12 | 0.08 | 0.06 | 0.06 |
| | b) $H_2SO_4$-concentration | % $H_2SO_4$ | 31 | 32 | 32 | 32 |
| | c) degree of hydrolysis $H_2SO_5/H_2S_2O_8$ | % | 30 | 30 | 30 | 30 |
| Pos. 14 | included angle at the venturi | | 11 | 11 | 11 | 11 |
| Pos. 22 | included angle at the venturi | | 15 | 15 | 15 | 15 |

We claim:

1. In a method of removing sulfur compounds oxidizable to form sulfuric acid and organic compounds oxidizable to form carbon dioxide and water from an exhaust gas of a contact-process plant for the production of sulfuric acid, wherein:
the exhaust gas is treated in a scrubbing cycle with a recirculated scrubbing acid consisting of a mixture of dilute sulfuric acid and peroxydisulfuric acid,
the peroxydisulfuric acid is produced by electrolyzing continuously dilute sulfuric acid,
the peroxydisulfuric acid is added to the scrubbing-acid cycle and the scrubbing acid takes up sulfuric acid formed as an oxidation product, and
the scrubbing acid is withdrawn from the cycle to remove the oxidation product, the improvement which comprises the steps of:
treating said gas in a vertical venturi tube and in uniflow with circulating scrubbing acid collected in a sump below said venturi tube;
passing the gas into a substantially horizontal venturi tube between said vertical tube and said sump, said horizontal venturi tube opening into an upwardly extending tower;
treating the gas in said horizontal venturi tube in uniflow with circulating scrubbing acid collected at the base of said tower and separating scrubbing acid from the gas in said tower for collection at the base thereof;
passing the gas together with entrained scrubbing acid through a packing layer and treating the gas in said packing layer with a countercurrent flow of circulating scrubbing acid from the base of said tower and introduced above said packing layer;
introducing the peroxydisulfuric acid into the scrubbing acid cycle by injecting it into said tower above said layer;
said peroxy disulfuric acid being produced from fresh dilute sulfuric acid independently of the acid circulated from the base of said tower;
the acid collected at the base of said tower being exclusively fed in a first part to said tower above said packing layer, a second part to said horizontal venturi tube and in a third part to the sump of said vertical venturi tube; and
maintaining the scrubbing acid level in the base of said tower substantially constant by continuously transferring to said sump as said third part a quantity of scrubbing acid equal to the quantity of added peroxydisulfuric acid and sulfuric acid in said tower and to the sulfuric acid formed as an oxidation product therein.

2. The improvement defined in claim 1 wherein a large part of the scrubbing acid injected into said vertical venturi tube is collected in said sump, the balance being entrained with said gas to said horizontal venturi tube, said improvement further comprising the step of trapping at least a portion of said balance of scrubbing acid in pockets along the inlet portion of said horizontal venturi tube and returning the trapped scrubbing acid to said sump.

3. The improvement defined in claim 1, further comprising the step of separating a substantial portion of the scrubbing acid injected into said vertical venturi tube from said gas upon emergence of said gas from said vertical venturi tube by passing said gas through a packing layer between said vertical venturi tube.

4. The improvement defined in claim 1, further comprising the step of maintaining the scrubbing acid level in the base of said tower substantially constant by continuously transferring to said sump a quantity of scrubbing acid equal to the quantity of added peroxydisulfuric acid and sulfuric acid in said tower and to the sulfuric acid formed as an oxidation product therein.

5. The improvement defined in claim 1, further comprising the step of maintaining the sulfuric acid concentration in said sump at a substantially constant steady-state concentration by adding water to said scrubbing acid in said sump.

6. The improvement defined in claim 5, further comprising the step of maintaining the level of scrubbing acid in said sump constant by continuously withdrawing scrubbing acid therefrom.

7. The improvement defined in claim 1 wherein the scrubbing acid in said tower and in said vertical venturi tube have different concentrations of sulfuric acid, the highest sulfuric acid concentration being provided in the scrubbing acid above said layer in said tower, a lower sulfuric acid concentration being provided for the scrubbing acid in said horizontal venturi tube and the lowest concentration of sulfuric acid being maintained in the scrubbing acid injected into said vertical venturi tube.

8. The improvement defined in claim 1 wherein the peroxydisulfuric acid is introduced into said tower in a solution having a concentration of 30 to 50% sulfuric acid and 180 to 350 g/liter peroxydisulfuric acid.

9. The improvement defined in claim 8 wherein the peroxydisulfuric acid is introduced into said tower in a solution having a concentration of 35 to 40% sulfuric acid and containing 200 to 300 g/liter of peroxydisulfuric acid.

10. The improvement defined in claim 8 wherein the solution containing peroxydisulfuric acid is held in intermediate storage following its production by electrolysis to increase the hydrolysis of peroxydisulfuric acid.

11. The improvement defined in claim 10 wherein the solution containing peroxydisulfuric acid is held in intermediate storage prior to introduction into said tower for a period sufficient to effect a degree of hydrolysis between 30 and 90% of the peroxydisulfuric acid.

12. The improvement defined in claim 11 wherein a steady-state concentration of the scrubbing acid is maintained in the base of said tower at 30 to 50% sulfuric acid and a molar concentration of active oxygen of 0.4 to 1.26 moles of active oxygen per liter.

13. The improvement defined in claim 12 wherein the steady-state concentration of sulfuric acid in the scrubbing acid at the bottom of said tower is 38 to 45% and the molar concentration of active oxygen is substantially 0.6 to 1.0 moles per liter.

14. The improvement defined in claim 12 wherein the scrubbing acid in said sump has a steady-state sulfuric acid concentration of 25 to 40% and a molar concentration of active oxygen of 0.06 to 0.3 moles per liter.

15. The improvement defined in claim 14 wherein the sulfuric acid concentration in said sump is 28 to 32% and the active oxygen concentration is 0.1 to 0.15 moles per liter.

16. The improvement defined in claim 14 wherein the residence time of the scrubbing acid at the bottom of said tower is selected to effect 20 to 90% hydrolysis of the residual peroxysulfuric acid.

17. The improvement defined in claim 16 wherein the residence time of the scrubbing acid in said sump is selected to effect 20 to 90% hydrolysis of the residual peroxydisulfuric acid therein.

18. The improvement defined in claim 17 wherein said venturi tubes have outlets with included angles of substantially 10° to 20°.

19. The improvement defined in claim 18 wherein said included angles are between 14° and 17°, inclusive.

20. The improvement defined in claim 18 wherein the gases pass through said tubes and said tower with an average residence time of 2 to 4 seconds.

21. The improvement defined in claim 20, further comprising the step of feeding the withdrawn scrubbing acid to a final absorber of a contact-process plate for the production of sulfuric acid.

* * * * *